US 11,848,915 B2

United States Patent
Arnon et al.

(10) Patent No.: US 11,848,915 B2
(45) Date of Patent: Dec. 19, 2023

(54) MULTI-PARTY PREDICTION USING FEATURE CONTRIBUTION VALUES

(71) Applicant: EMC IP Holding Company LLC, Hopkinton, MA (US)

(72) Inventors: Ohad Arnon, Beit Nir (IL); Shiri Gaber, Beer Sheva (IL); Ronen Rabani, Kibutz Tlalim 1 (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 398 days.

(21) Appl. No.: 17/106,253

(22) Filed: Nov. 30, 2020

(65) Prior Publication Data

US 2022/0174048 A1 Jun. 2, 2022

(51) Int. Cl.
*H04L 9/40* (2022.01)
*G06N 5/04* (2023.01)
*G06N 20/00* (2019.01)

(52) U.S. Cl.
CPC .......... *H04L 63/0407* (2013.01); *G06N 5/04* (2013.01); *G06N 20/00* (2019.01)

(58) Field of Classification Search
CPC . H04L 63/0407; H04L 63/0428; H04L 63/04; G06N 20/00; G06N 20/20; G06N 5/04
See application file for complete search history.

(56) References Cited

U.S. PATENT DOCUMENTS

2021/0073678 A1* 3/2021 Chu .................. G06N 3/084
2021/0342847 A1* 11/2021 Shachar ............. G06N 20/00

OTHER PUBLICATIONS https://towardsdatascience.com/shap-explained-the-way-i-wish-someone-explained-it-to-me-ab81cc69ef30.
https://towardsdatascience.com/explain-your-model-with-the-shap-values-bc36aac4de3d.
https://papers.nips.cc/paper/2017/file/8a20a8621978632d76c43dfd28b67767-Paper.pdf.
https://medium.com/@gabrieltseng/interpreting-complex-models-with-shap-values-1c187db6ec83.

* cited by examiner

*Primary Examiner* — Olugbenga O Idowu
(74) *Attorney, Agent, or Firm* — Ryan, Mason & Lewis, LLP

(57) ABSTRACT

Techniques are provided for multi-party prediction using feature contribution values. One method comprises obtaining a first set of feature contribution values associated with respective ones of a plurality of machine learning models, wherein each machine learning model is trained using training data of a different party and each feature contribution value indicates a contribution by a corresponding feature to a prediction generated by the associated machine learning model; training an aggregate machine learning model using the obtained first sets of feature contribution values; receiving a second set of feature contribution values generated by applying data of at least one party to at least one machine learning model; and applying the second set of feature contribution values to the trained aggregate machine learning model to obtain a global prediction. Each feature contribution value may correspond to a masked feature, and the feature contribution values may not expose the source data of one party to another party.

20 Claims, 6 Drawing Sheets

MULTI-PARTY PREDICTION USING FEATURE CONTRIBUTION VALUES

FIELD

The field relates generally to information processing systems, and more particularly to the processing of data in such information processing systems.

BACKGROUND

Data protection techniques are often employed to secure data. Multi-party computation techniques, for example, may be used when datasets from different parties include useful information for solving one or more problems, but the data cannot be shared among the parties, for example, due to privacy, competitive and/or regulatory concerns.

A need exists for improved techniques for protecting data in a multi-party environment.

SUMMARY

In one embodiment, a method comprises obtaining a first set of feature contribution values, such as SHAP (SHapley Additive exPlanations) values, associated with respective ones of a plurality of machine learning models, wherein each machine learning model is trained using training data of a different party and wherein each feature contribution value indicates a contribution by a corresponding feature to a prediction generated by the associated machine learning model; training an aggregate machine learning model using the obtained first sets of feature contribution values; receiving at least one second set of feature contribution values generated by applying data of at least one party to one or more of the machine learning models; and applying the at least one second set of feature contribution values to the trained aggregate machine learning model to obtain a global prediction related to at least some of the data of one or more of the different parties.

In some embodiments, each feature contribution value corresponds to a masked feature, and the feature contribution values do not expose the source data of one party to another party.

Other illustrative embodiments include, without limitation, apparatus, systems, methods and computer program products comprising processor-readable storage media.

DETAILED DESCRIPTION

Figure 1:
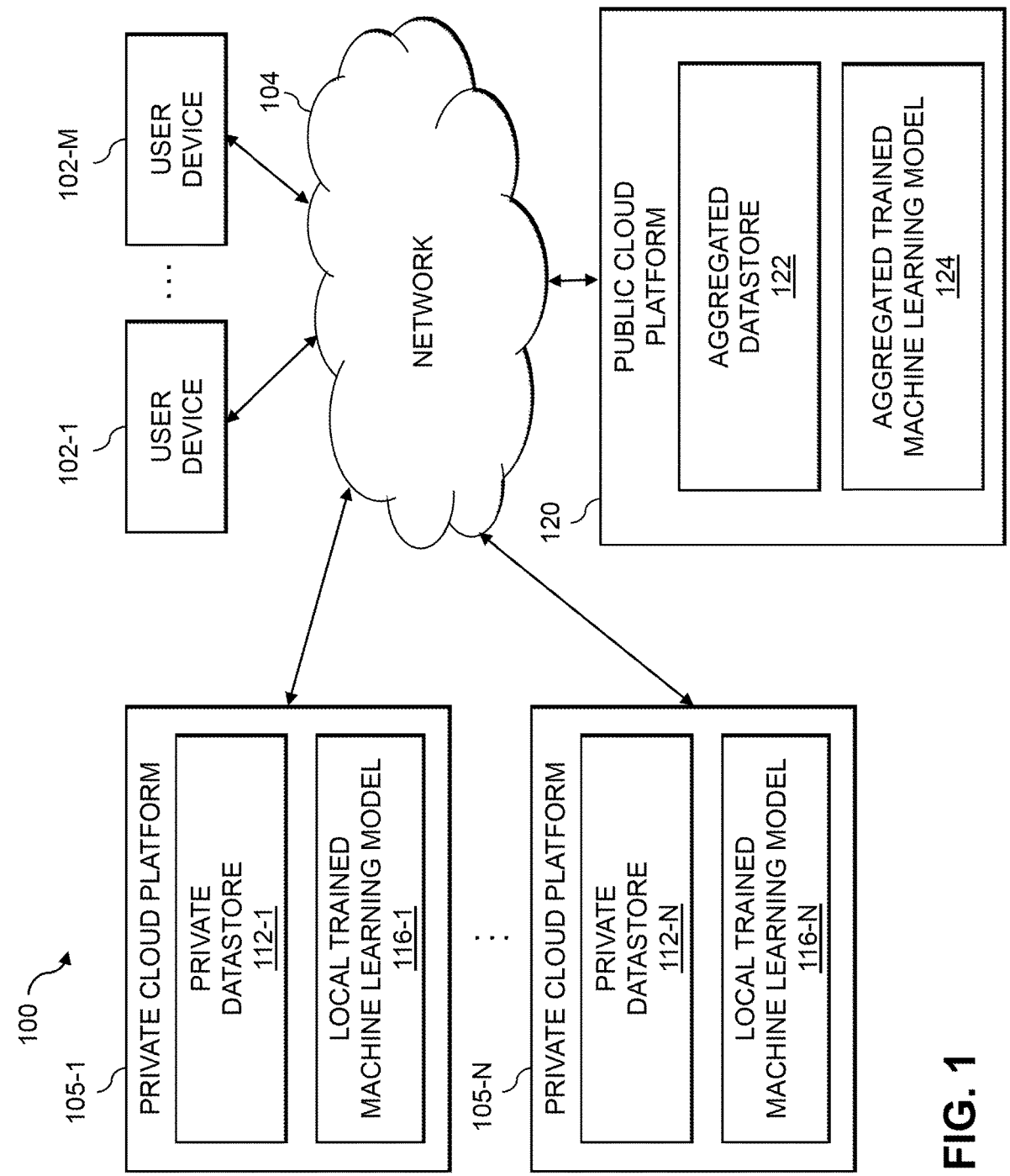
FIG. 1 illustrates an information processing system configured for multi-party prediction using feature contribution values in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for multi-party prediction using feature contribution values, such as SHAP values. The term "feature contribution value," as used herein, is intended to be broadly construed to encompass any values indicating (e.g., quantifying) a contribution by a corresponding feature to a prediction generated by a machine learning model or that otherwise encode a contribution of a corresponding feature to a prediction generated by a machine learning model, as would be apparent to a person of ordinary skill in the art.

In one or more embodiments, the disclosed multi-party prediction techniques apply feature contribution values from multiple federated machine learning models as inputs to an aggregate machine learning model that generates one or more global prediction values. SHAP values, for example, are a form of interpretation of machine learning models, where the normalized contribution of each feature to the prediction is the SHAP value for the respective feature.

Data privacy is a concern for many federated machine learning implementations. Vertical federated learning, for example, typically has a number of overlapping instances but few overlapped features. For example, insurers and online retailers often have many overlapped users, but each domain has its own feature space and labels. Classical vertical federated learning implementations merge the features to create a more extensive feature space for machine learning tasks and may use homomorphic encryption to protect data privacy for the involved parties. This approach is under scrutiny, however, and, in practice, there is still no reliable way to combine vertical federated models without sharing the source data among the parties.

One or more aspects of the disclosure recognize that SHAP values or other feature contribution values can be used as inputs to an aggregate machine learning model in a vertical federated machine learning scenario. In this manner, the feature contribution values employed to solve problems protect the data privacy of the involved parties, without compromising the information typically contained in a large and extensive feature space.

In at least some embodiments, the results from several sub-models on different feature sets (visible only to the owner of the data), are incorporated into the global prediction generated by the aggregate machine learning model.

There are many use cases where companies want to collaborate in order to better answer a business question by joining their insights, while still protecting their data and intellectual property. Data sharing is often avoided due to privacy, as well as legislative constraints. Thus, the data relevant to solving a specific problem is only partially visible, ensuring inferior results.

Homomorphic encryption allows computations to be performed on encrypted values without decrypting the encrypted values. By sharing public and private keys by the process initiator, federated models can be updated without access to the data itself. There are multiple issues with this approach, and, in practice, there is no reliable way to combine vertical federated machine learning models without sharing the data itself. In at least some implementations, a homomorphic encryption model can be completely secure.

Data exploration, model training and an execution efficiency, however, can be problematic.

There are a number of issues with anonymization and sharing of anonymized data. For example, it remains unclear whether it is a possible guard against de-anonymization by crossing different parameters if the population is small enough. In addition, removing features for the sake of anonymization can lead to a deterioration of the results.

It can be shown that an ensemble technique where the prediction is aggregated over multiple sub-models improves the outcome and reduces the variance. Model stacking takes this approach further by training a new model to best aggregate the results from several sub-models.

The disclosed techniques for multi-party prediction using feature contribution values allow classification machine learning algorithms to be applied over multiple data sets belonging to different (potentially rival) parties. Training is performed without sharing any of the raw data between the various parties, and the final model provides a global prediction while maintaining data privacy and security.

In some embodiments, federated machine learning models are applied over each data set separately, and then the feature contribution values generated by each model are shared. In one or more embodiments, the SHAP values from the multiple federated machine learning models are used as inputs to an aggregate classification machine learning algorithm that provides one or more predictions based on the incorporated SHAP values.

FIG. 1 shows a computer network (also referred to herein as an information processing system) 100 configured in accordance with an illustrative embodiment. The computer network 100 comprises a plurality of user devices 102-1 through 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is a plurality of private cloud platforms 105-1 through 105-N (collectively referred to herein as private cloud platforms 105) and one or more public cloud platforms 120.

In some embodiments, a given private cloud platform 105 can be implemented on the premises of a respective organization, such as part of a data center. In other embodiments, the sensitive data of an organization that is protected using the disclosed techniques for multi-party prediction can be stored in a traditional data center that is not part of a private cloud.

The user devices 102 may comprise, for example, host devices and/or devices such as mobile telephones, laptop computers, tablet computers, desktop computers or other types of computing devices. Such devices are examples of what are more generally referred to herein as "processing devices." Some of these processing devices are also generally referred to herein as "computers." The user devices 102 may comprise a network client that includes networking capabilities such as Ethernet, Wi-Fi, etc. When the user devices 102 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices. Such applications illustratively generate input-output (TO) operations that are processed by a storage system. The term "input-output" as used herein refers to at least one of input and output. For example, IO operations may comprise write requests and/or read requests directed to logical addresses of a particular logical storage volume of the storage system. These and other types of IO operations are also generally referred to herein as IO requests.

The user devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The one or more public cloud platforms 120 illustratively comprise processing devices of one or more processing platforms. For example, the public cloud platform 120 can comprise one or more processing devices each having a processor and a memory, possibly implementing virtual machines and/or containers, although numerous other configurations are possible.

The exemplary public cloud platform 120 can be part of cloud infrastructure such as an Amazon Web Services (AWS) system. Other examples of cloud-based systems that can be used to provide at least portions of the one or more public cloud platforms 120 include Google Cloud Platform (GCP), Microsoft Azure, Dell Technologies Cloud, IBM Cloud, Alibaba Cloud and HPe (Hewlett Packard Enterprise) Cloud.

As shown in the example of FIG. 1, the public cloud platform 120 comprises an aggregated datastore 122 and an aggregated trained machine learning model 124.

In some embodiments, communications among two or more of the user devices 102, the private cloud platforms 105 and/or the public cloud platform 120 (or one or more storage systems within the private cloud platforms 105 and/or the public cloud platform 120) may comprise IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The user devices 102 are configured to interact over the network 104 with one or more of the private cloud platforms 105 and/or the public cloud platforms 120. Such interaction illustratively includes generating IO operations, such as write and read requests, and sending such requests over the network 104 for processing by one or more of the public cloud platforms 120. In some embodiments, each of the user devices 102 comprises a driver configured to control delivery of IO operations from the host device to one or more of the public cloud platforms 120 over one or more paths through the network 104.

The public cloud platform 120 may further include one or more additional modules and other components typically found in conventional implementations of public cloud storage systems, although such additional modules and other components are omitted from the figure for clarity and simplicity of illustration.

The public cloud platform 120 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the user devices 102 (for example, when implemented as host devices) may be implemented in whole or in part on the same processing platform as the private cloud platform 105, public cloud platform 120 and/or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 102, private cloud platform 105, and the public cloud platform 120 to reside in different data centers. Numerous other distributed implementations of the host devices, private cloud platform 105 and the public cloud platform 120 are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

As also depicted in FIG. 1, each private cloud platform 105-1 through 105-N further comprises a private datastore 112-1 through 112-N and one or more local trained machine learning models 116-1 through 116-N, as discussed further below, for example, in conjunction with FIG. 2.

It is to be appreciated that this particular arrangement of the local trained machine learning model 116 illustrated in each private cloud platform 105 of the FIG. 1 embodiment is presented by way of example only, and alternative arrangements can be used in other embodiments. For example, the functionality associated with the local trained machine learning model 116 in other embodiments can be separated across multiple modules. As another example, multiple distinct processors can be used to implement the local trained machine learning model 116 or portions thereof.

At least portions of a module that implement the local trained machine learning model 116 may be implemented at least in part in the form of software that is stored in memory and executed by a processor. An exemplary process utilizing the local trained machine learning model 116 of an example private cloud platform 105 in computer network 100 will be described in more detail with reference to the flow diagrams of, for example, FIGS. 3 and 4.

One or more of the private datastores 112 may employ one or more storage devices (not shown in FIG. 1). The storage devices store data of a plurality of storage volumes, such as respective logical units (LUNs) or other types of logical storage volumes. The term "storage volume" as used herein is intended to be broadly construed, and should not be viewed as being limited to any particular format or configuration.

The user devices 102 and the private cloud platform 105 may be implemented on a common processing platform, or on separate processing platforms. The user devices 102 (for example, when implemented as host devices) are illustratively configured to write data to and read data from one or more of the storage devices on the private cloud platform 105 in accordance with applications executing on those host devices for system users.

The storage devices of one or more private cloud platforms 105 illustratively comprise solid state drives (SSDs). Such SSDs are implemented using non-volatile memory (NVM) devices such as flash memory. Other types of NVM devices that can be used to implement at least a portion of the storage devices include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the private cloud platform 105.

It is therefore to be appreciated that numerous different types of storage devices can be used in the private cloud platform 105 in other embodiments. For example, a given private cloud platform 105 as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

The term "storage system" as used herein is therefore intended to be broadly construed, and should not be viewed as being limited to particular storage system types, such as, for example, CAS (content-addressable storage) systems, distributed storage systems, or storage systems based on flash memory or other types of NVM storage devices. A given storage system as the term is broadly used herein can comprise, for example, any type of system comprising multiple storage devices, such as network-attached storage (NAS), storage area networks (SANs), direct-attached storage (DAS) and distributed DAS, as well as combinations of these and other storage types, including software-defined storage.

The private cloud platforms 105 can further comprise one or more input-output devices (not shown), which illustratively comprise keyboards, displays or other types of input-output devices in any combination. Such input-output devices can be used, for example, to support one or more user interfaces to the private cloud platform 105, as well as to support communication between the private cloud platform 105 and other related systems and devices not explicitly shown.

The user devices 102 and the private cloud platform 105 in the FIG. 1 embodiment are assumed to be implemented using at least one processing device. Each such processing device generally comprises at least one processor and an associated memory, and implements one or more functional modules for controlling certain features of the private cloud platform 105.

More particularly, user devices 102 and private cloud platform 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the user devices 102, the private cloud platform 105, and/or one or more of the public cloud platforms 120 to communicate over the network 104 with each other (as well as one or more other networked devices), and illustratively comprises one or more conventional transceivers.

It is to be understood that the particular set of elements shown in FIG. 1 for multi-party prediction is presented by way of illustrative example only, and in other embodiments additional or alternative elements may be used. Thus, another embodiment includes additional or alternative systems, devices and other network entities, as well as different arrangements of modules and other components.

For example, while one or more embodiments of the disclosure are illustrated using a plurality of private cloud platforms 105 and one or more public cloud platforms 120 for the disclosed techniques for multi-party prediction, any combination of cloud environments may be employed to protect the sensitive data stored in one or more of the private cloud platforms 105. The term "cloud environment," as used herein, shall be broadly construed to encompass public clouds, private clouds, data centers, portions thereof and/or combinations thereof, as those terms are understood by a person of ordinary skill in the art. In a hybrid cloud environment, for example, resources can be shared between a private cloud and one or more public clouds.

Figure 2:
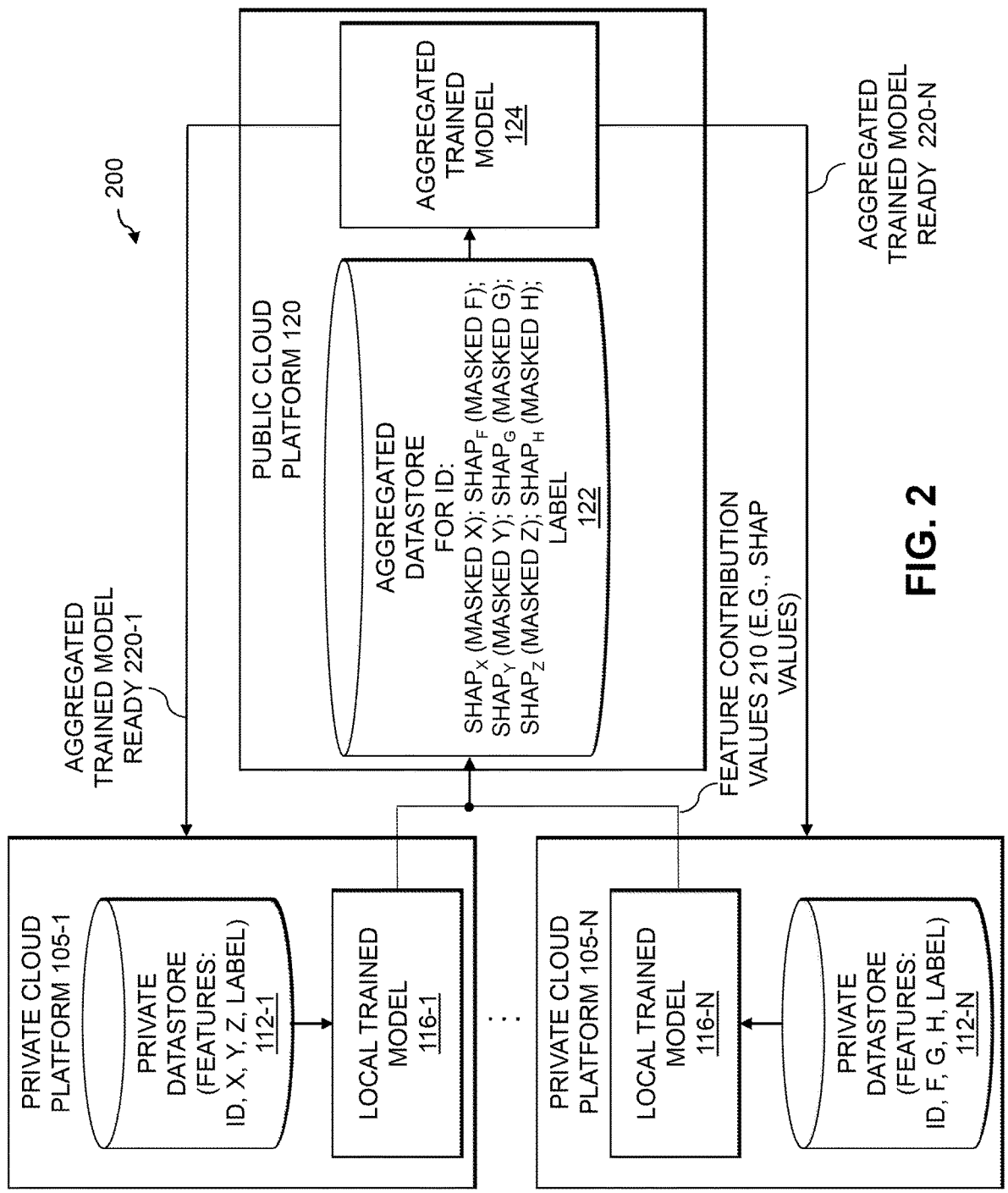
FIG. 2 illustrates the private and public cloud platforms of FIG. 1 in further detail, according to at least one embodiment.

FIG. 2 illustrates the private cloud platforms 105 and public cloud platform 120 of FIG. 1 in further detail, according to at least one embodiment. As shown in the example 200 of FIG. 2, the private datastore 112-1 in the private cloud platform 105-1 comprises an identifier (ID), feature X, feature Y, feature Z, and a label. In addition, the private datastore 112-N in the private cloud platform 105-N comprises an identifier, feature F, feature G, feature H, and a label. The private cloud platforms 105 each also comprise the local trained machine learning model 116, as discussed above in conjunction with FIG. 1.

It is noted that the identifier in each private datastore 112 identifies overlapping instances in each data set, such as data for the same person in both data sets. The identifier in each private datastore 112 can be considered a unique key that is shared for joining the output from the separate private datastores 112 and local trained machine learning models 116. The feature sets across the two data sets in the private datastores 112 are independent, but, in at least some embodiments, the label and identifier are the same. The same label is used to train each local trained machine learning model 116 and the aggregated trained machine learning model 124. For example, if training one or more models to learn whether an individual will be infected with COVID (e.g., using economic data and health data), the label indicates whether a given individual will be infected (e.g., yes/no or true/false).

As discussed hereinafter, for each of the data sets in the private datastores 112, the respective local trained machine learning model 116 is executed on the raw (source) data in the private datastores 112. As shown in FIG. 2, each local trained machine learning model 116 generates feature contribution values 210, such as SHAP values, which are sent to the public cloud platform 120 and aggregated into the aggregated datastore 122. To protect the data, the name of each feature can be masked in some embodiments, for example, by hashing the feature name.

In the example 200 of FIG. 2, for the identifier, ID, the aggregated datastore 122 comprises a SHAP value, $SHAP_X$, for the masked feature X from the private datastore 112-1; a SHAP value, $SHAP_F$, for the masked feature F from the private datastore 112-N, a SHAP value, $SHAP_Y$, for the masked feature Y from the private datastore 112-1; a SHAP value, $SHAP_G$, for the masked feature G from the private datastore 112-N; a SHAP value, $SHAP_Z$, for the masked feature Z from the private datastore 112-1; and a SHAP value, $SHAP_H$, for the masked feature H from the private datastore 112-N. In addition, the aggregated datastore 122 further comprises the label associated with the feature contribution values 210.

In addition, the exemplary aggregated trained machine learning model 124 executes a machine learning classification algorithm over the feature contribution value results in the aggregated datastore 122, coming from the federated algorithms of the local trained machine learning models 116. The exemplary aggregated trained machine learning model 124 sends a notification 220-1 through 220-N to the individual private cloud platforms 105-1 through 105-N when the aggregated trained machine learning model is ready.

Figure 3:
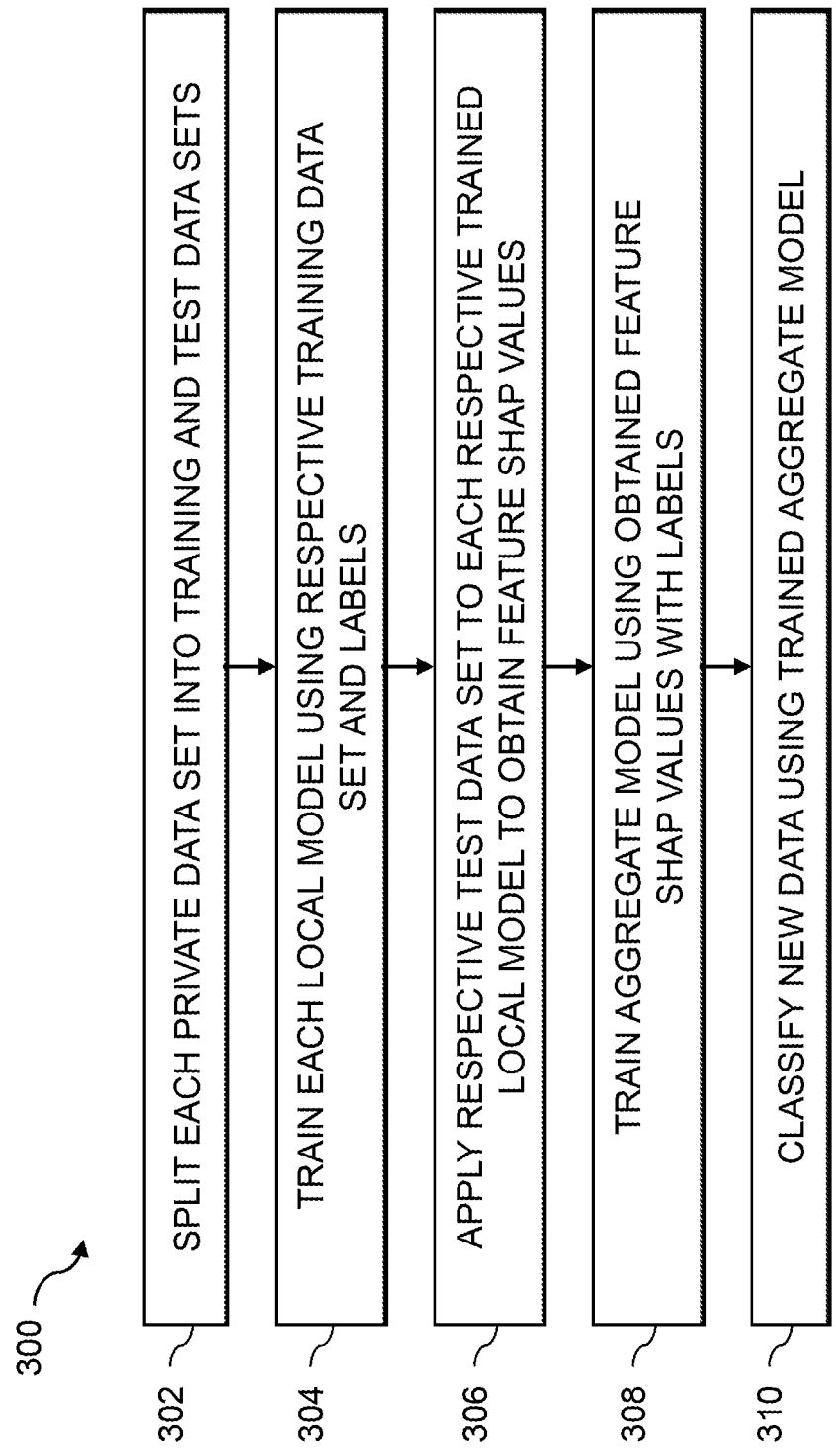
FIGS. 3 and 4 are flow diagrams illustrating exemplary implementations of multi-party prediction processes that use feature contribution values, such as SHAP values, according to illustrative embodiments.

FIG. 3 is a flow diagram illustrating an exemplary implementation of a multi-party prediction process 300 that uses SHAP values, according to one embodiment. In the example of FIG. 3, portions of the exemplary multi-party prediction process 300 are performed by respective modules in the private cloud platforms 105 and the public cloud platform 120. As shown in FIG. 3, in step 302, the multi-party prediction process 300 splits each data set in the private datastores 112 into training and test data sets. Each local trained machine learning model 116 is trained in step 304 using the respective training data and labels.

Thereafter, in step 306, the respective test data is applied to the corresponding local trained machine learning model 116 to obtain feature SHAP values (e.g., for each data sample, get features as SHAP values and a prediction).

In step 308, the aggregated trained machine learning model 124 is trained using the obtained feature SHAP values and one or more labels. New data is classified in step 310 using the aggregated trained machine learning model 124. For example, for each sample of new data being classified by the local trained machine learning models 116, a prediction and the corresponding SHAP values can be generated (which can be considered features). The accuracy of each local trained machine learning model 116 may be used in some embodiments to weight features of the respective local trained machine learning model 116. Thereafter, the SHAP values from each local trained machine learning model 116 are classified by the aggregated trained machine learning model 124 to generate a single prediction.

In one or more exemplary implementations, the Milky Way platform is employed to run the disclosed techniques for multi-party prediction using feature contribution values. Among other benefits, the Milky Way platform allows for permission governance (e.g., access control to datasets) such that each participating party would be a logical data zone between which raw data cannot be shared.

Figure 4:
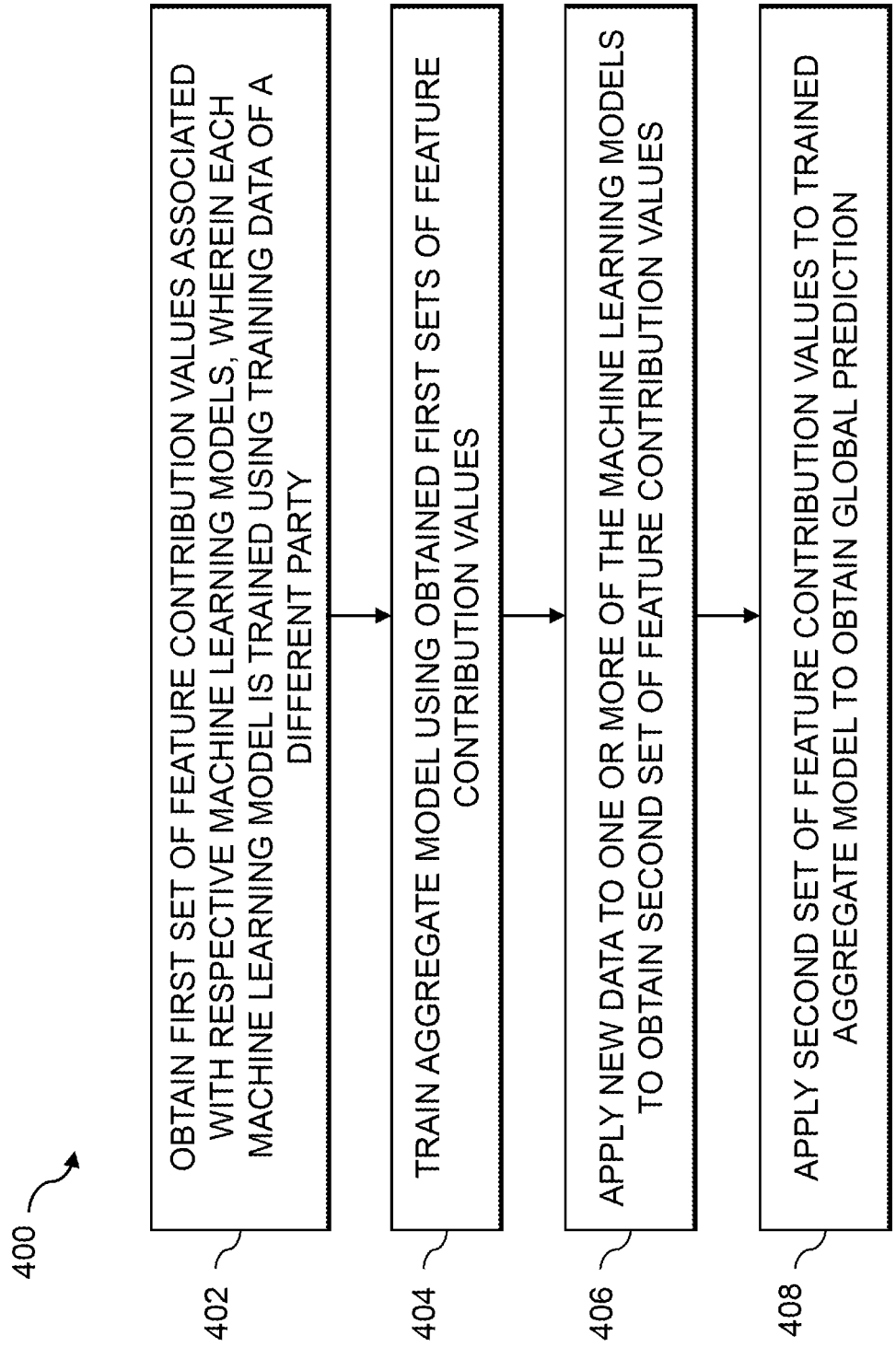

FIG. 4 is a flow diagram illustrating an exemplary implementation of a multi-party prediction process 400 that uses feature contribution values, according to at least some embodiments. In the example of FIG. 4, the exemplary multi-party prediction process 400 is performed by one or more modules of the public cloud platform 120. As shown in FIG. 4, in step 402, the exemplary multi-party prediction process 400 obtains a first set of feature contribution values (e.g., SHAP values) associated with respective machine learning models, wherein each machine learning model is trained using training data of a different party. The feature contribution values indicate a contribution by a corresponding feature to a prediction generated by the associated machine learning model.

In step 404, an aggregate machine learning model is trained using the obtained first sets of feature contribution values. In step 406, new data of at least one party is applied to one or more of the machine learning models to obtain at least one second set of feature contribution values. The second set of feature contribution values are applied in step 408 to the trained aggregate machine learning model to obtain a global prediction (e.g., related to a person, a place and/or a thing associated with at least some of the data of the different parties). The thing may comprise, for example, a system, a device and/or a hardware component in some embodiments.

In some embodiments, the feature contribution values indicate a contribution by a corresponding feature (e.g., a masked feature) to a prediction generated by the associated machine learning model. Among other benefits, the feature contribution values do not expose the source data of a respective party to a different party, and the training and run-time data sets of a first party are not shared with another party. The different parties may comprise, for example, different data owners, different users and/or different entities.

The particular processing operations and other network functionality described in conjunction with the flow diagrams of FIGS. 3 and 4 are presented by way of illustrative example only, and should not be construed as limiting the scope of the disclosure in any way. Alternative embodiments can use other types of processing operations for multi-party prediction using feature contribution values. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

One or more embodiments of the disclosure provide improved methods, apparatus and computer program products for multi-party prediction using feature contribution values. The foregoing applications and associated embodiments should be considered as illustrative only, and numerous other embodiments can be configured using the techniques disclosed herein, in a wide variety of different applications.

Among other benefits, the disclosed techniques for multi-party prediction using feature contribution values allows data for multiple parties to be joined, in order to provide better results, and to allow model insights to be better generalized. Safely merging data over different datasets or data factories (e.g., finance and health data) provides a broader view for solving business problems (e.g., identifying persons at risk of getting infected with COVID-19). With a reliable way to share data, big companies can generate revenue from data that previously could not be leveraged, as in the healthcare domain.

In at least some embodiments, an aggregate machine learning model incorporates information from several federated models by using their predicted SHAP values (or other feature contribution values) as inputs to the aggregate machine learning model. The source data cannot be reconstructed from the feature contribution values as the underlying model and predictions themselves are not shared across parties. Still, one or more aspects of the disclosure recognize that feature contribution values hold relevant information for training and generating accurate predictions.

In one or more embodiments, features that may be indicative do not need to be eliminated, as only the SHAP values or other feature contribution values are shared, and the raw (e.g., source) data is not shared.

A "stacked generalization" approach works by training a new model to best aggregate the results from several sub-models. The stacked generalization approach has been shown to result in better predictive performance than any single contributing model. SHAP values, for example, encode the contribution of each feature to the prediction of each federated model. In this respect, any patterns learned by sub-models are learned and amplified by the aggregated model that receives the SHAP values as input.

In an exemplary metrology industry, assume that two competitive companies in the metrology industry would like to cooperate to improve their results in the fabrication. Each competitor is scanning the same wafer to detect a defect in its process. The respective algorithms are based on the raw data generated by their respective metrology. One or more aspects of the disclosure recognize that to improve results, the competitors need to collaborate.

Since they are competitors, however, the two companies are not willing to share their data and data scheme, which constitutes their valuable intellectual property. The disclosed techniques for multi-party prediction using feature contribution values provide a secure way for the competitors to cooperate.

After training federated models on each of the feature spaces of each competitor, the competitors share the feature contribution values of each prediction for x, y-coordinates on the wafer. These coordinate values act as the value for joining the data for one unified feature contribution value data set. On this data set, a new aggregate classification algorithm is trained, and the prediction indicates whether the results are normal or there is a defect in this location.

In an exemplary data markets domain, straightforward and predefined analytics are typically performed on non-private datasets (as defined by the General Data Protection Regulation (GDPR)). There are currently no analytics performed on private data as part of the services offered by data markets to their customers. For example, Data Market Austria and International Data Spaces Association are two different data markets seeking a solution for running data analytics on private shared data under GDPR privacy restrictions. The disclosed techniques for multi-party prediction using feature contribution values provide a secure methodology for advanced analytics and collaboration across rival parties.

In addition, the disclosed techniques for multi-party prediction using feature contribution values may be employed to detect money laundering. Finance data is typically privacy protected. Thus, most anti-money-laundering algorithms are running on a single data set (e.g., provided by only one finance institution), rather than running on multiple diverse data sets from several different providers. With existing techniques, the current evaluation of the risk score/assessment is poor and there is a high number of false positives and false negatives in detecting money laundering, both resulting in high money loss to a given company.

It can be shown that SHAP values and other feature contribution values can be used to enhance results provided by a machine learning model trained on a partial view of the raw data to solve a specific problem. A Random Forest model can be trained on each data set and tested with different data. A first test can provide the feature contribution values to be input to the common model. A second test can compare the results between each model to the common model. One exemplary implementation demonstrated improved results by the common model trained using the SHAP values, compared to each of the federated models trained on the partial raw data. While the observed precision of the common model was between the precision of the federated models, the recall of the common model was much higher than both federated models.

Innovative and secure ways to share data allows companies to generate revenue from data that previously could not be leveraged. A notable example is the healthcare domain, where the need for cross company cooperation for developing scalable solutions is more pressing than ever.

It should also be understood that the disclosed techniques for multi-party prediction using feature contribution values, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for multi-party prediction using feature contribution values may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based multi-party prediction engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based multi-party prediction platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionalities within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
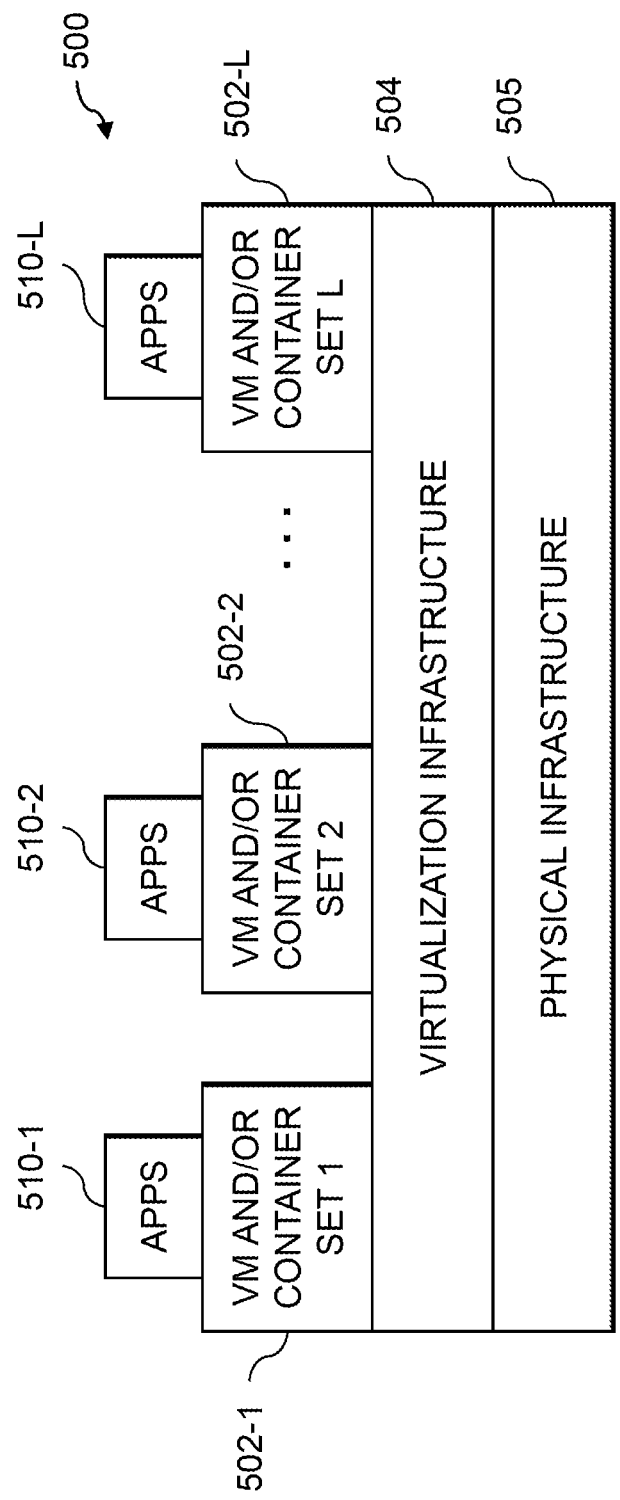
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide multi-party prediction functionality of the type described above for one or more processes running on a given one of the VMs. For example, each of the VMs can implement multi-party prediction control logic and data protection functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide multi-party prediction functionality of the type described above for one or more processes running on different ones of the containers. For example, a container host device supporting multiple containers of one or more container sets can implement one or more instances of multi-party prediction control logic and associated data protection functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a WAN, a LAN, a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an ASIC, an FPGA or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
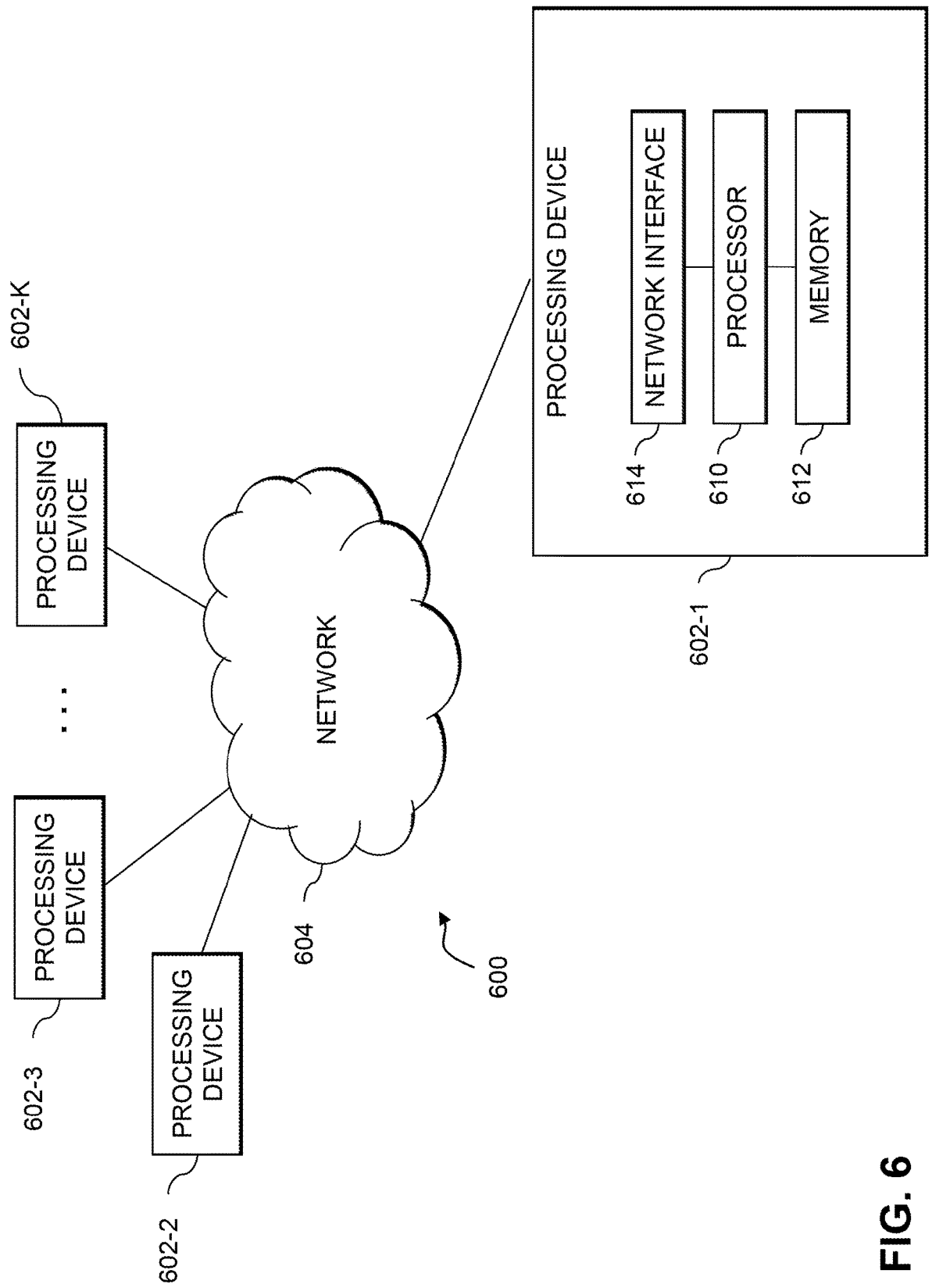
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining a first set of feature contribution values associated with respective ones of a plurality of machine learning models, wherein each machine learning model is trained using training data of a different party and wherein each feature contribution value indicates a contribution by a corresponding feature to a prediction generated by the associated machine learning model;
training an aggregate machine learning model by applying the obtained first sets of feature contribution values to the aggregate machine learning model;
receiving at least one second set of feature contribution values generated by applying data of at least one party to one or more of the machine learning models; and
applying the at least one second set of feature contribution values to the trained aggregate machine learning model to obtain a global prediction related to at least some of the data of one or more of the different parties;
wherein the method is performed by at least one processing device comprising a processor coupled to a memory.

2. The method of claim 1, wherein each of the feature contribution values corresponds to a masked feature.

3. The method of claim 1, wherein each first set of obtained feature contribution values does not expose the source data of a respective party to a different party.

4. The method of claim 1, wherein the feature contribution values comprise SHAP values.

5. The method of claim 1, wherein the training of the aggregate machine learning model further employs at least one label generated by at least one machine learning model.

6. The method of claim 1, wherein a training data set of a first party is not shared with another party.

7. The method of claim 1, further comprising employing one or more data access controls to prevent data of a first party from being accessed by another party.

8. The method of claim 1, wherein the different parties comprise one or more of different data owners, different users and different entities.

9. An apparatus comprising:
at least one processing device comprising a processor coupled to a memory;
the at least one processing device being configured to implement the following steps:
obtaining a first set of feature contribution values associated with respective ones of a plurality of machine learning models, wherein each machine learning model is trained using training data of a different party and wherein each feature contribution value indicates a contribution by a corresponding feature to a prediction generated by the associated machine learning model;
training an aggregate machine learning model by applying the obtained first sets of feature contribution values to the aggregate machine learning model;
receiving at least one second set of feature contribution values generated by applying data of at least one party to one or more of the machine learning models; and
applying the at least one second set of feature contribution values to the trained aggregate machine learning model to obtain a global prediction related to at least some of the data of one or more of the different parties.

10. The apparatus of claim 9, wherein each first set of obtained feature contribution values does not expose the source data of a respective party to a different party.

11. The apparatus of claim 9, wherein the feature contribution values comprise SHAP values.

12. The apparatus of claim 9, wherein the training of the aggregate machine learning model further employs at least one label generated by at least one machine learning model.

13. The apparatus of claim 9, further comprising employing one or more data access controls to prevent data of a first party from being accessed by another party.

14. The apparatus of claim 9, wherein the different parties comprise one or more of different data owners, different users and different entities.

15. A non-transitory processor-readable storage medium having stored therein program code of one or more software programs, wherein the program code when executed by at least one processing device causes the at least one processing device to perform the following steps:
obtaining a first set of feature contribution values associated with respective ones of a plurality of machine learning models, wherein each machine learning model is trained using training data of a different party and wherein each feature contribution value indicates a contribution by a corresponding feature to a prediction generated by the associated machine learning model;
training an aggregate machine learning model by applying the obtained first sets of feature contribution values to the aggregate machine learning model;
receiving at least one second set of feature contribution values generated by applying data of at least one party to one or more of the machine learning models; and
applying the at least one second set of feature contribution values to the trained aggregate machine learning model to obtain a global prediction related to at least some of the data of one or more of the different parties.

16. The non-transitory processor-readable storage medium of claim 15, wherein each first set of obtained feature contribution values does not expose the source data of a respective party to a different party.

17. The non-transitory processor-readable storage medium of claim 15, wherein the feature contribution values comprise SHAP values.

18. The non-transitory processor-readable storage medium of claim 15, wherein the training of the aggregate machine learning model further employs at least one label generated by at least one machine learning model.

19. The non-transitory processor-readable storage medium of claim 15, further comprising employing one or more data access controls to prevent data of a first party from being accessed by another party.

20. The non-transitory processor-readable storage medium of claim 15, wherein the different parties comprise one or more of different data owners, different users and different entities.

* * * * *